(12) United States Patent
Zheng et al.

(10) Patent No.: US 12,327,007 B2
(45) Date of Patent: Jun. 10, 2025

(54) DATA INTERACTION METHOD AND APPARATUS, DEVICE, AND STORAGE MEDIUM

(71) Applicant: Beijing Zitiao Network Technology Co., Ltd., Beijing (CN)

(72) Inventors: Yi Zheng, Beijing (CN); Yue Ben, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/392,698

(22) Filed: Dec. 21, 2023

(65) Prior Publication Data
US 2024/0126413 A1 Apr. 18, 2024

Related U.S. Application Data

(63) Continuation of application No. PCT/CN2022/110867, filed on Aug. 8, 2022.

(30) Foreign Application Priority Data

Aug. 11, 2021 (CN) .......................... 202110921114.X (51) Int. Cl.
*G06F 3/0483* (2013.01)
*G06Q 30/0282* (2023.01)
*G06Q 30/0601* (2023.01)

(52) U.S. Cl.
CPC ....... *G06F 3/0483* (2013.01); *G06Q 30/0282* (2013.01); *G06Q 30/0631* (2013.01); *G06Q 30/0641* (2013.01)

(58) Field of Classification Search
CPC .............. G06F 3/0483; G06Q 30/0282; G06Q 30/0631; G06Q 30/0641
(Continued)

(56) References Cited

U.S. PATENT DOCUMENTS

2012/0316955 A1* 12/2012 Panguluri ............... G06Q 30/06
707/706
2016/0162979 A1* 6/2016 Robinson ........... G06Q 30/0639
705/26.9
(Continued)

FOREIGN PATENT DOCUMENTS

CN 105844494 A * 8/2016
CN 108462889 A * 8/2018
(Continued)

OTHER PUBLICATIONS

First Office Action dated Nov. 25, 2022 in CN Appl. No. 202110921114.X, English translation (21 pages).
(Continued)

*Primary Examiner* — Mark Edwards (57) ABSTRACT

Disclosed herein are a data interaction method and apparatus, a device, and a storage medium. The data interaction method comprises: displaying, in a video stream pushing page of a preset application, a video stream matching a preset recommendation category; receiving a preset trigger operation acting on the video stream pushing page; and in response to the preset trigger operation, displaying a preset page corresponding to the preset recommendation category, a preset service for are commended object being provided in the preset page, and the recommended object belonging to the preset recommendation category.

14 Claims, 6 Drawing Sheets

(58) Field of Classification Search
USPC .......................................................... 715/771
See application file for complete search history.

(56) References Cited

U.S. PATENT DOCUMENTS

| | | | |
|---|---|---|---|
| 2018/0260840 A1* | 9/2018 | Jeon | ...................... G06N 20/00 |
| 2020/0322684 A1 | 10/2020 | Dong et al. | |
| 2022/0327583 A1* | 10/2022 | Fotso | ................. G06Q 30/0282 |

FOREIGN PATENT DOCUMENTS

| | | | |
|---|---|---|---|
| CN | 108769725 A | 11/2018 |
| CN | 111222042 A | 6/2020 |
| CN | 111783001 A | 10/2020 |
| CN | 112040250 A | 12/2020 |
| CN | 112348649 A | 2/2021 |
| CN | 113608650 A | 11/2021 |

OTHER PUBLICATIONS

Second Office Action dated Mar. 19, 2023 in CN Appl. No. 202110921114.X, English translation (21 pages).
International Search Report dated Nov. 8, 2022 in PCT Appl. No. PCT/CN2022/110867, English translation (5 pages).
European Search Report for EP Patent Application No. 22855390.5, Issued on Aug. 6, 2024, 11 pages.

* cited by examiner

DATA INTERACTION METHOD AND APPARATUS, DEVICE, AND STORAGE MEDIUM

This application is a continuation of International Application No. PCT/CN2022/110867, as filed on Aug. 8, 2022, which claims priority to China Patent Application No. 202110921114.X filed to CNIPA on Aug. 11, 2021, which is incorporated by reference in the present application in its entirety.

TECHNICAL FIELD

The present disclosure relates to the technical field of Internet, in particular to a data interaction method and apparatus, a device and a storage medium.

BACKGROUND

With the rapid development of information technology and the popularity of Mobile Internet, applications can provide more and more network information for the user; generally, in the case where the user has no definite search intention, applications may recommend information to the user by pushing video streams.

The video streams contain various categories of content, one of which is to push a recommended object to the user who views a video stream, wherein the recommended object here may comprise, for example, a tangible product or a specific service provided by a seller or store, or the like. When the user sees a recommended object of interest, it is possible to perform an operation of viewing the relevant information of the recommended object or placing an order or the like by an input operation on a current video stream demonstration page. However, the above-described interaction method is relatively entrenched with poor flexibility, and needs to be improved.

SUMMARY

The present disclosure provides a data interaction method and apparatus, a storage medium and a device, which may optimize a data interaction solution.

In the present disclosure, a data interaction method is provided, which comprises:
displaying a video stream matched with a preset recommended category in a video stream push page of a preset application;
receiving a preset trigger operation acting on the video stream push page; and
displaying a preset page corresponding to the preset recommended category in response to the preset trigger operation, wherein the preset page provides a preset service for a recommended object belonging to the preset recommended category.

In the present disclosure, a data interaction apparatus is provided, which comprises:
a video stream display module configured to demonstrate a video stream matched with a preset recommended category in a video stream push page of a preset application;
a trigger operation receiving module configured to receive a preset trigger operation acting on the video stream push page; and
a preset page display module configured to display a preset page corresponding to the preset recommended category in response to the preset trigger operation, wherein the preset page provides a preset service for a recommended object belonging to the preset recommended category.

In the present disclosure, a computer-readable storage medium is provided, which has a computer program stored thereon that, when executed by a processor, implements the data interaction method described above.

In the present disclosure, an electronic device is provided, which comprises a memory, a processor and a computer program stored in the memory and executable on the processor, wherein the processor, when executing the computer program, performs the data interaction method described above.

DETAILED DESCRIPTION

The embodiments of the present disclosure will be described below with reference to the accompanying drawings. Although some embodiments of the present disclosure are shown in the accompanying drawings, the present disclosure may be implemented in a plurality of forms, and these embodiments are provided for understanding the present disclosure. The accompanying drawings and embodiments of the present disclosure are for exemplary purposes only.

A plurality of steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

The concepts such as "first" and "second" and the like mentioned in the present disclosure are only used to distinguish different devices, modules or units, but not to limit the order or interdependence of functions performed by these devices, modules or units.

The modifications of "one" and "a plurality of" mentioned in the present disclosure are illustrative rather than restrictive, and those skilled in the art should understand that they should be understood as "one or more" unless specified otherwise in the context.

The names of messages or information exchanged between multiple devices in the embodiments of the present disclosure are only used for illustrative purposes, but not for limiting the scope of these messages or information.

In the following embodiments, alternative features and examples are provided in each embodiment at the same time; a plurality of features recited in the embodiments may be combined to form a plurality of alternative solutions, and each numbered embodiment should not be regarded as only one technical solution.

Figure 1:
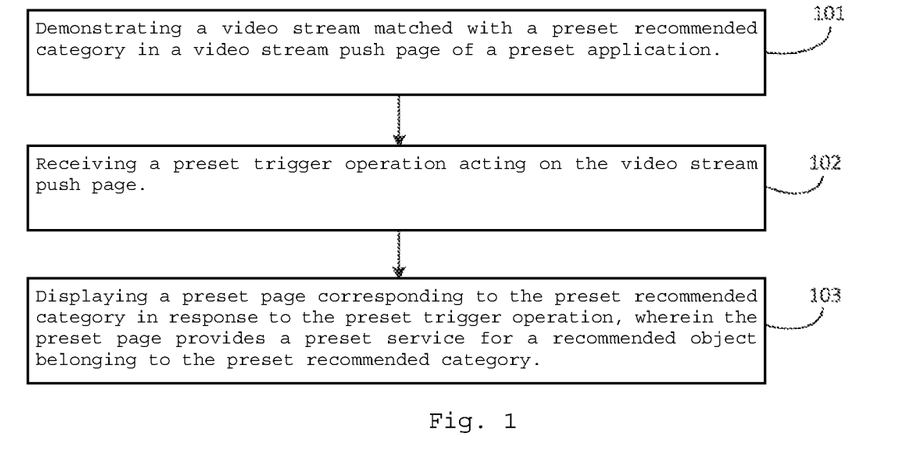
FIG. 1 is a flowchart of a data interaction method provided by an embodiment of the present disclosure.

FIG. 1 is a flowchart of a data interaction method provided by an embodiment of the present disclosure, which may be performed by a data interaction apparatus, wherein the device may be implemented by software and/or hardware, and may be generally integrated in an electronic device. The electronic device may be a mobile device such as a cell phone, a smart watch, a tablet computer and a personal digital assistant; and may also be other devices such as a desktop computer. As shown in FIG. 1, the method comprises:

Step 101, demonstrating a video stream matched with a preset recommended category in a video stream push page of a preset application.

In the embodiment of the present disclosure, the type of the preset application is not limited, for example, the preset application may be a video clip application, a live-streaming application and the like, and may also be other types of applications. The preset application has a function of pushing video streams, which may comprise live video streams or video streams of video clips and the like, and the source and pushing mechanism of the video stream and the like may be set by the preset application according to actual requirements. Generally, the video stream may be posted by the user who logs in the preset application, and may also be posted by a platform corresponding to the preset application.

As an example, the recommended category may be understood as a category or classification of the recommended object; in this embodiment, a category classifying method is not limited, and generally, the recommended objects belonging to the same recommended category may be mutually associated or may be replaceable with each other. The recommended object may comprise a product or a service and the like; for example, the recommended object may be a tangible product or a specific service provided by a seller or store which may be referred to as a provider of the recommended object. Wherein, the product may comprise food, flowers, medicine, cosmetics or daily necessities or the like; and the service may comprise house-keeping services, maintenance services or installation services or the like. In order to facilitate the understanding, some of the contents in the following will be illustratively described with the recommended object as a product and the provider as a store. The preset recommended category may be understood as a category to be recommended or promoted by way of video streaming.

As an example, to be matched with a preset recommended category may be understood as the video stream containing information related to the preset recommended category. The video content of the video stream may comprise related information of the recommended object belonging to the preset recommended category, and the related information may comprise, for example, speech narration, graphic narration or video narration or the like of the recommended object. For example, the video stream is a live video stream, the preset recommended category is barbecue, the recommended object belonging to the barbecue category may comprise, for example, roast lamb leg, and the live video stream may comprise real-time screens of the anchor sampling roast lamb leg and the anchor's narration of roast lamb leg; for another example, the video stream is a video stream of a video clip, the recommended category is lipstick, the recommended object belonging to the lipstick category may comprise, for example, a lipstick with a garnet color number, and the video clip may comprise a video screen of the video clip author sampling the lipstick with this color number and the video clip author's narration of the lipstick with this color number and the like.

As an example, the preset recommended category may be set by a poster of the video stream; in this embodiment, a setting method is not limited, for example, the category name may be user-defined, and may also be selected from the recommended category library provided in the preset application.

As an example, the preset recommended category may also be obtained by identifying the content of the video stream by the preset application, and in this embodiment, an identifying method is not limited. For example, image screenshot may be performed on subjects except for characters in the video stream, and target identification may be performed on the screenshot image using a neural network model trained in advance, so as to determine a corresponding preset recommended category.

Step 102, receiving a preset trigger operation acting on the video stream push page.

In the embodiment of the present disclosure, the form of a preset trigger operation is not limited, for example, the preset trigger operation may be click, double click, long press or sliding or the like. The electronic device may receive a preset trigger operation according to an inputting method corresponding to the preset trigger operation and identify the preset trigger operation.

In one embodiment, a preset control may be displayed in the video stream push page, wherein the preset control may be understood as a control to trigger displaying a preset page described later; in this embodiment, the embodiment form and display position and the like of the preset control are not limited. Generally, the video stream push page may contain some controls for the user to input an interactive operation, and the original control may be multiplexed as a preset control, or a preset control may be newly added on the basis of the original control. The user may input a preset trigger operation on the preset control, and this step may be to receive a preset trigger operation acting on the preset control.

Step 103, displaying a preset page corresponding to the preset recommended category in response to the preset trigger operation, wherein the preset page provides a preset service for a recommended object belonging to the preset recommended category.

In the embodiment of the present disclosure, the preset page may be a native page of a preset application or a page of a mini program associated with a preset application, and in this embodiment, a page form is not limited. After it is determined that a preset trigger operation acting on the video stream push page is received, a response may be made to the preset trigger operation, and a responding method may comprise displaying a preset page corresponding to the preset recommended category. In the preset page, a preset service may be provided for a recommended object belonging to the preset recommended category, and the number of recommended objects which may be one or more, may be set in advance or dynamically determined according to actual conditions. As described in the above examples, the recommended category is barbecue, and the recommended object may comprise roast lamb leg provided by different stores, and may also comprise mutton skewers, roasted scallops or roasted beans and the like; the recommended category is lipstick, and the recommended object may comprise a lipstick with a garnet color number provided by different brands, and may also comprise lipsticks with other colors or lipsticks with special functions, such as lipsticks with sunscreen function, and the like.

As an example, the preset service may comprise an instant delivery service, a reservation service, a preferential information providing service, a group purchase service or an express mail service and the like. Wherein, the instant delivery service may be understood as a service of delivering a recommended object to the user in a short time in response to a service request of the user, and may also be understood as a take-out delivery service, wherein the take-out delivery here may be understood in a broad sense, such that providing a product and a service by going out may be understood as take-out delivery. Short time described above may comprise immediate delivery or delivery within scheduled time. If the provider corresponding to a recommended object supports scheduled delivery, for example, supporting scheduled delivery in the next day or a couple of days, the delivery service may be provided within scheduled time specified by the user, thereby satisfying the needs of the user more flexibly. Taking the live-streaming scene as an example, the user may lock a preferential price of the recommended object by placing an order immediately and scheduling a delivery, and accept a delivery service of the recommended object as convenient. The instant delivery service may be provided by a provider of the recommended object or by a platform corresponding to the preset application, and this embodiment is not limited thereto. For the case where the recommended object is a tangible product, the seller may be responsible for transporting the product to the user, or the platform corresponding to the preset application may be responsible for transporting the product to the user after picking up the product from the seller; and for the case where the recommended object is a specific service, the seller may assign a special person to go out to the user so as to provide a corresponding service for the user.

In the embodiment of the present disclosure, the content displayed on the preset page is not limited. For example, the preset page may comprise a preset service application entrance corresponding to the recommended object, so that the user may apply for a preset service, for example, placing an order through the application entrance, and may also perform other related operations on the preset service, for example, setting a delivery address, selecting a payment method and paying an order, and the like; after placing an order, it is also possible to view an order state, view the order information, cancel the order, apply for a refund and contact a provider, and the like. As an example, the preset page may also comprise an entrance of a preset service page of a target provider corresponding to the preset recommended category, and the like.

In the data interaction solution provided in the embodiment of the present disclosure, a video stream matched with a preset recommended category is displayed in a video stream push page of a preset application, a preset trigger operation acting on the video stream push page is received, and a preset page corresponding to a preset recommended category is displayed in response to a preset trigger operation, wherein a preset service for a recommended object is provided in the preset page, and the recommended object belongs to the preset recommended category. By using the above-described technical solution, in the pushed video stream, related recommended objects are recommended by category, and if the user is interested in the preset recommended category during the process of viewing a video stream matched with the preset recommended category, it is possible to enter into providing a preset service for a recommended object belonging to the preset recommended category by inputting a trigger operation on the video stream push page, thereby improving the probability that different recommended objects under the same category are recommended to the user; compared with a recommendation method of specific products only for specific brands and specific stores in the related art, it is possible to enrich a selection range of the user with a more flexible recommendation method, and diversify an interactive form based on video-streaming, thereby enhancing the interactive effect and enriching the functions of an application; in addition, it is also possible to improve the traffic efficiency of a preset application, and further improve the utilization rate of related resources such as a corresponding platform or server or the like.

In some embodiments, the preset page comprises an aggregation page of a target provider for providing a preset service for the recommended object, and the aggregation page contains an entrance of a preset service page of the target provider; wherein before the displaying a preset page corresponding to the preset recommended category, the method further comprises: selecting a target provider from a preset provider set corresponding to the preset application. This setting has the following advantages: an appropriate target provider may be automatically selected for the user by a preset application, and an entrance of a preset service page of a target provider may be displayed in the aggregation page, which is convenient for the user to trigger a corresponding entrance according to personal preference, so as to obtain a corresponding preset service. Wherein, the preset provider set corresponding to a preset application may be understood as a set composed of a certain number of providers set on the platform corresponding to the preset application in advance, for example, comprising a store in a city that can dock with the platform.

Generally, a plurality of target providers may be selected, and if a plurality of providers that satisfy preset selection conditions are not present, there may also be 1 or 0 target provider. For example, when the preset service is an instant delivery service, and the user's location is remote so that there is no store that satisfies the delivery requirements, there may be 0 target provider, and at this time, the user may be prompted, for example to change a delivery address and the like. When there are a plurality of target providers, the aggregation page contains entrances of a plurality of preset service pages corresponding to a plurality of target providers, which may be selected by the user according to personal needs.

In some embodiments, the selecting a target provider from a preset provider set corresponding to the preset application comprises: selecting a target provider from a preset provider set corresponding to the preset application according to at least one of the user's location information, the user's interest information on a candidate provider subset, the user's interest information on a recommended object, the user's interest information on the video stream content or the provider's state information, wherein the preset provider set comprises at least one candidate provider subset. This setting has the following advantages: it is possible to accurately select a target provider, which conforms more to actual needs of the user.

As an example, the user's location information may comprise the location information or delivery address information, etc., and the user's location information may be obtained through a positioning method such as Global Positioning System (GPS) and the like under the authorization of the user, and the delivery address information may be determined according to the user's input or the user's historical delivery destination information. The distance between the user and each provider may be determined according to the user's location information, so that it is possible to screen out a provider within a service range or a provider closer to the user.

As an example, for some providers, it is possible to belong to a provider organization, for example, some stores belong to the same brand, and may be a franchising chain, a main store or a branch store or the like. The preset provider set comprises at least one candidate provider subset, and different stores under the same brand may be comprised in a candidate provider subset. For the same category, the user's degree of interest in different brands might be different, and therefore, the provider in the candidate provider subset in which the user is more interested may be selected as a target provider according to the user's interest information in the candidate provider subset.

As an example, the user's interest information in the content of the video stream may comprise the degree of interest of the user in the content of the video stream; if there is a high degree of interest, more target providers may be recommended, and if there is a low degree of interest, less target providers may be recommended.

As an example, the provider's state information may comprise, for example, whether the provider is currently in a normal service state, which may comprise a state such as in business or for reservation or the like, and correspondingly, an abnormal service state may comprise, for example, temporarily closed or temporarily rest or the like. In addition, it is also possible to comprise, for example, the degree of busyness and the like; for a service that has a high requirement for timeliness, for example, an instant delivery service, if the store is busy currently, it is possible that an order might not be received in time, which may affect the quality of the service, so that the degree of busyness may also be a factor considered when determining a target provider.

In one embodiment, a target provider may be selected based on at least two of the above-described items, so that it is possible to select a target provider that is more suitable for a current user by evaluation from a plurality of dimensions. The selected items may be set according to a type of a preset service.

The plurality of target providers determined may comprise different providers under the same organization, and may also be any two target providers belonging to different organizations. In one embodiment, first of all, a target provider organization, i.e., a target candidate provider subset, is determined, and then one or more corresponding target providers are determined for the target candidate provider subset.

In some embodiments, each candidate provider in a preset provider set may be rated according to at least one of the user's location information, the user's interest information on a candidate provider subset, the user's interest information on a recommended object, the user's interest information on the video stream content or the provider's state information, and a target provider may be determined according to a rating result. For example, a candidate provider with a rating greater than a rating threshold may be determined as a target provider, or a candidate provider with a rating ranking superior to a preset ranking may be determined as a target provider, or the like. In this embodiment, the rating rules are not limited, and different weight coefficients may be set in the case of a plurality of rating items so as to obtain a more reasonable rating.

The displaying a preset page corresponding to the preset recommended category comprises: displaying a preset page corresponding to the preset recommended category according to a rating result of the target provider, wherein an entrance of a preset service page of a target provider in the preset page is displayed according to a rating in a descending sequence. This setting has the following advantages: it is possible to provide a valuable reference for the user's selection by displaying an entrance according to a rating sequence and help the user to quickly select a satisfactory target provider.

In some embodiments, the video stream carries a category identifier corresponding to the preset recommended category, and the category identifier is set by a poster corresponding to the video stream; wherein the selecting a target provider from a preset provider set corresponding to the preset application comprises: selecting a target provider matched with the category identifier from a preset provider set corresponding to the preset application. This setting has the following advantages: the poster may independently select a preset recommendation category to be recommended before publishing a video stream, which makes own narration or process of producing a video stream more targeted and enhances the recommendation effect. In one embodiment, the preset application may provide the poster with a list of category identifiers, so that the poster may select a category identifier from the list. The preset application may maintain a correspondence relationship between a category identifier and a provider, so that a corresponding provider may be quickly located according to a category identifier during the process of determining a target provider according to at least one of the above-described information.

In some embodiments, the preset page comprises an aggregation page of a plurality of target providers, wherein the aggregation page contains entrances of a plurality of preset service pages corresponding to the plurality of target providers for providing a preset service for the recommended object respectively, and the plurality of candidate provider subsets to which the plurality of target providers belong respectively are set by a poster of the video stream. This setting has the following advantages: it is possible to allow the poster to independently select a plurality of target organizations to be recommended according to a preset recommended category, and in this case, the target organizations are generally strictly inspected and screened by the poster, which is more conducive to ensuring the quality of the recommended object; moreover, the content of the video stream is more targeted, which is convenient for the user to deeply learn about the detailed information of a preset recommended category.

In some embodiments, the video stream push page comprises a live video stream push page; wherein while displaying a preset page corresponding to the preset recommended category, there also comprises: determining a current recommended object that is being narrated by an anchor; displaying an entrance of a preset service page of a target provider of the current recommended object using a first preset display method, and displaying an entrance of a preset service page of a target provider of the preset recommended object using a second preset display method in the preset page, wherein the first preset display method is different from the second preset display method, and the preset recommended object comprises an recommended object in the preset page except for the current recommended object. This setting has the following advantages: the anchor may narrate different recommended objects belonging to different target providers of a preset recommended category respectively, which is convenient for the user to make horizontal comparison so as to perform differential display on the recommended object that is being narrated currently, and which is convenient for the user to quickly and accurately locate an entrance of a preset service page corresponding to a corresponding target provider so as to obtain a corresponding preset service. Differentiated display may be understood as a different display method from an entrance of a preset service page corresponding to a remaining target provider in the preset page; for example, an entrance of a preset service page corresponding to a target provider of a current recommended object may be pinned in display, a prompt message such as "narrating" may be added, and a background color different from other entrances may also be used.

Figure 2:
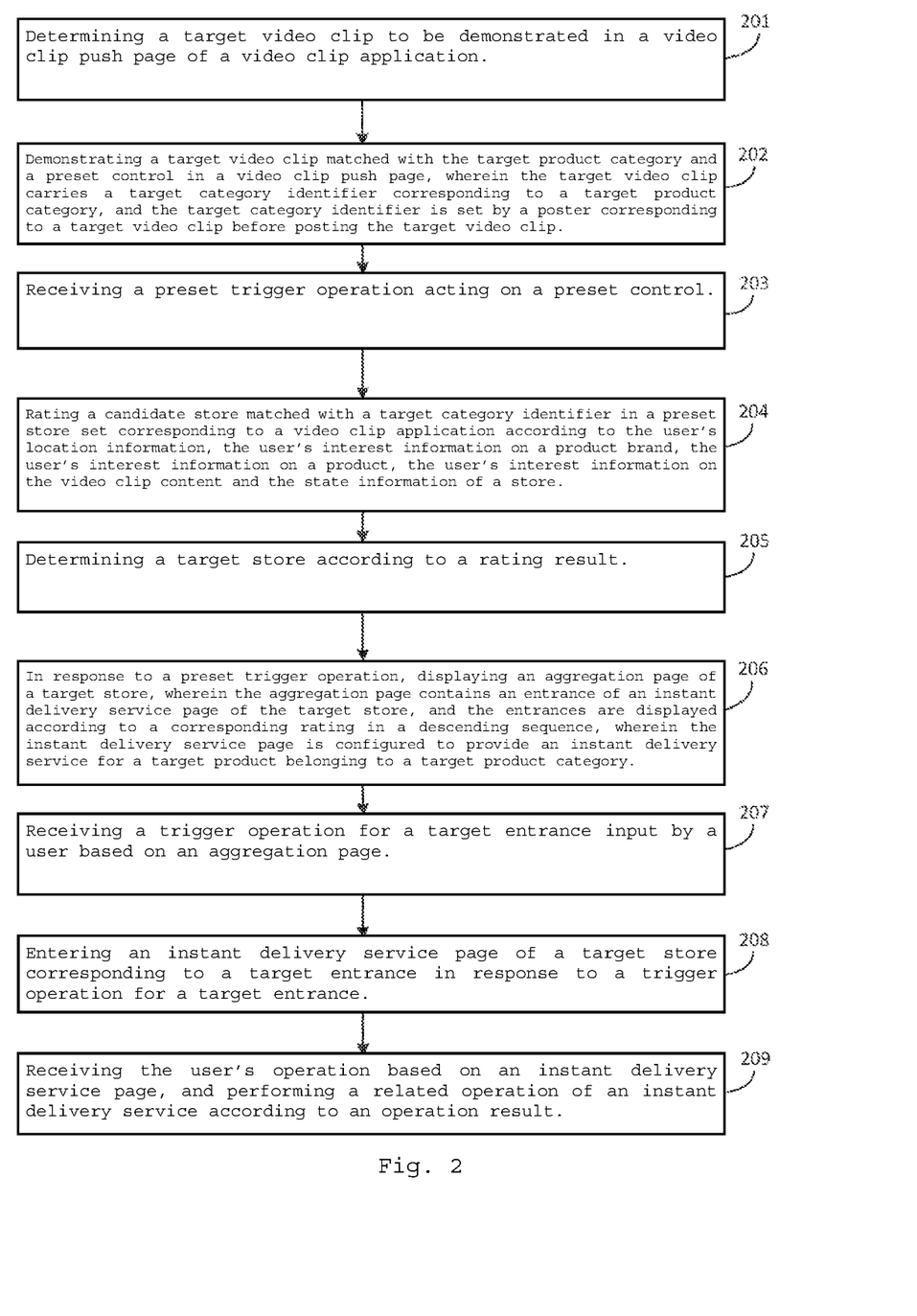
FIG. 2 is a flowchart of another data interaction method provided by an embodiment of the present disclosure.

FIG. 2 is a flowchart of another data interaction method provided by an embodiment of the present disclosure; the embodiment of the present disclosure is described based on the solution in the above-described embodiments, and taking a video clip recommendation scene in which an instant delivery service is provided as an example, the method comprises the following steps:

Step 201, determining a target video clip to be demonstrated in a video clip push page of a video clip application.

As an example, for a video clip recommendation scene in which a video author needs to be switched, a target video clip may be determined according to a video clip recommendation algorithm; and for the case where the user actively selects a video clip to be played, for example, the user selecting a video clip work in a personal homepage of a video author, a target video clip may be determined according to the user's selection.

Step 202, demonstrating a target video clip matched with the target product category and a preset control in a video clip push page, wherein the target video clip carries a target category identifier corresponding to a target product category, and the target category identifier is set by a poster corresponding to a target video clip before posting a target video clip.

As an example, a video clip author may select a product category, for example, Home Cuisine, milk tea, crayfish or kebabs or the like, to be recommended or promoted before shooting a video clip, during the process of shooting a video clip or before posting a completed shoot. In one embodiment, the video clip application may provide the video clip author with a category list, which is convenient for the video clip author to quickly make a selection, and may also support a user-defined input. After setting a target product category, the video clip author may post a video clip without selecting a product brand or store.

As an example, when the user browses a target video clip matched with a target product category, the video clip application may demonstrate a preset control in a video clip push page, wherein the preset control is configured to indicate to the user that the target video clip that is being played currently may support an instant delivery service of a product. In one embodiment, the prompt information of an instant delivery service is displayed within a preset range of a preset control.

Figure 3:
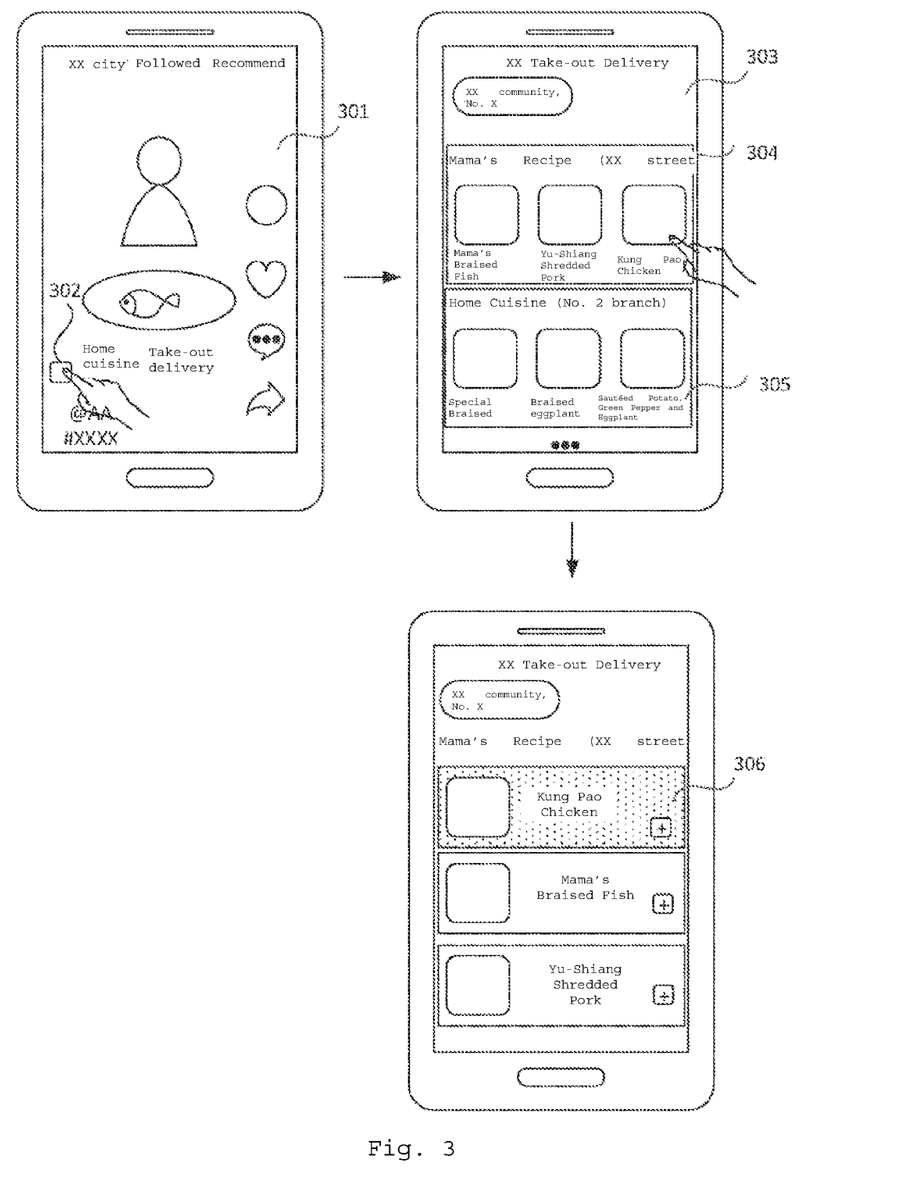
FIG. 3 is a schematic view of a page of an interaction process provided by an embodiment of the present disclosure.

As an example, the target product category is Home Cuisine, and FIG. 3 is a schematic view of a page of an interaction process provided by an embodiment of the present disclosure; as shown in FIG. 3, the video clip content in the video clip push page 301 is the video author's narration of Braised Fish belonging to a Home Cuisine category, and a preset control 302 may be displayed, and the target product category of "Home Cuisine" and the prompt information of an instant delivery service with the words "Take-out Delivery" are displayed on the right side of the preset control 302, so that the user may trigger the preset control 302 to jump to an aggregation page of the store.

Step 203, receiving a preset trigger operation acting on a preset control.

Step 204, rating a candidate store matched with a target category identifier in a preset store set corresponding to a video clip application according to the user's location information, the user's interest information on a product brand, the user's interest information on a product, the user's interest information on the video clip content and the state information of a store.

As an example, first of all, a candidate store that may provide an instant delivery service of a product of a target category may be screened out from a preset store set according to a target category identifier, so as to input the plurality of information described above into a neural network model trained in advance for each candidate store, and determine a rating of a corresponding candidate store according to a model output result.

Step 205, determining a target store according to a rating result.

In one embodiment, steps 204 and 205 may also be performed before step 203, that is, a target store may be determined in advance, so as to improve a response speed of a preset trigger operation, and also preload an aggregation page in advance so as to improve the interaction efficiency.

Step 206, in response to a preset trigger operation, displaying an aggregation page of target stores, wherein the aggregation page contains entrances of instant delivery service pages of the target stores, and the entrances are displayed according to a corresponding rating in a descending sequence, wherein the instant delivery service page is configured to provide an instant delivery service for a target product belonging to a target product category.

As shown in FIG. 3, the user clicks a preset control 302 to enter an aggregation page 303 of target stores. Assuming that there are three target stores, in view that the display space of an aggregation page might be limited by a screen size of the electronic device, first of all, entrances of instant service pages of some target stores may be displayed in the aggregation page and entrances corresponding to other target stores may be switched by sliding vertically or horizontally. As shown in FIG. 3, the aggregation page 303 displays entrances of instant service pages of two target stores, which may be marked as the first entrance 304 and the second entrance 305 respectively. At an entrance, a preset number of candidate products under the target store may be displayed, for example, the best-selling dishes of a store, and the three best-selling dishes shown in the accompanying drawing serve as candidate products.

Step 207, receiving a trigger operation for a target entrance input by a user based on an aggregation page.

As shown in FIG. 3, the two stores may both provide an instant delivery service for products of a Home Cuisine category, and the user may select a target entrance according to personal preferences; for example, the user prefers the store "Mom's Recipe", so that it is possible to input a trigger operation for the first entrance 304, that is, the target entrance is the first entrance 304 at this time. In one embodiment, the trigger operation for the target entrance may act on a displayed candidate dish (i.e., a candidate recommended object), and the selected candidate dish may be marked as a target candidate dish (i.e., a target candidate recommended object).

Step 208, entering an instant delivery service page of a target store corresponding to a target entrance in response to a trigger operation for a target entrance.

As shown in FIG. 3, the user clicks the first entrance 304 to enter an instant delivery service page of a corresponding target store. In one embodiment, since the user has selected Kung Pao Chicken in an aggregation page, the target candidate dish is Kung Pao Chicken, and differential display is performed on an instant delivery service application entrance 306 corresponding to a target candidate dish by using a preset display method that may be pinned display in which a background color of an entrance is changed.

Step 209, receiving the user's operation based on an instant delivery service page, and performing a related operation of an instant delivery service according to an operation result.

As an example, after the user confirming an order, the relevant order information may be pushed to a target store side, so that the target store will make the relevant dishes, so as to provide a dish take-out service to the user. In addition, the user may also view the order information, contact a seller and contact a delivery man in the video clip application.

The data interaction method provided by the embodiment of the present disclosure may be applied to a video clip push scene, wherein the video clip author may independently set a product category to be narrated, and post a video clip with a content material matched with the product category, and after the user views a video clip and triggers a preset control, the video clip application may automatically identify a store and a product in which the user might be interested from a product library of the platform, and display an aggregation page containing service page entrances of related services of a plurality of stores; the abundance of the dimensions such as brand, store and price and the like may be greatly improved to provide the user with more options, and the interaction forms based on a video clip are more diversified, thereby enhancing the interaction effect, expanding the audience and improving the product recommendation efficiency; when the number of video clips reaches a certain scale, the video clips corresponding to the same product category may form a synergistic effect and improve the traffic efficiency, thereby improving the utilization rate of related resources such as a video clip platform or a video clip application back-end server or the like.

On the basis of the above-described embodiments, a video clip may also be replaced by a live stream, and a corresponding preset control may be designed according to the characteristics of a live stream push page, and other interactive logic and page designs may be similar, which will not be described in detail here.

Figure 4:
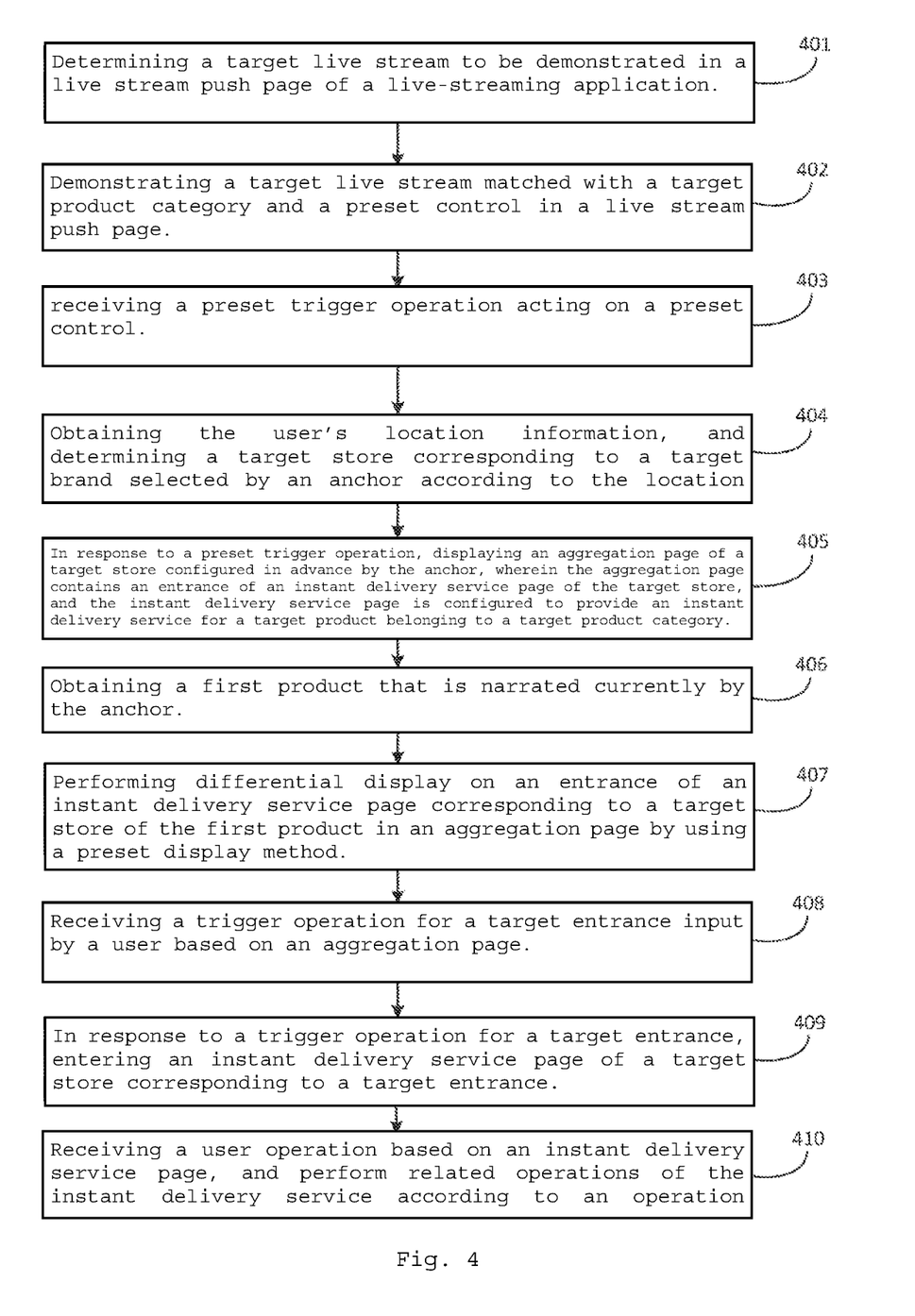
FIG. 4 is a flowchart of a further data interaction method provided by an embodiment of the present disclosure.

FIG. 4 is a flow chart of a further data interaction method provided by an embodiment of the present disclosure, and the embodiment of the present disclosure is explained based on the solutions in the above-described embodiments, and taking a video live scene as an example to provide an instant delivery service, the method comprises the following steps:

Step 401, determining a target live stream to be demonstrated in a live stream push page of a live-streaming application.

For example, in the case of switching a live room, a target live room may be determined according to the push algorithm of live-streaming, so as to determine a target live stream to be played in the target live room; for the same live room, a product category to be explained by an anchor may be determined according to an operation of an anchor side, so as to determine a corresponding target live stream.

Step 402, demonstrating a target live stream matched with a target product category and a preset control in a live stream push page.

As an example, before live-streaming, the anchor may select a product category to be recommended or promoted. In one embodiment, the live-streaming application may provide a category list for the anchor, which is convenient for the anchor to quickly make a selection, and also support a user-defined input. After setting a target product category, the anchor may continue to set a plurality of product brands to be recommended or promoted that are matched with a selected category. In one embodiment, an aggregation page of a plurality of target providers (target stores) corresponding to a preset recommended category (a preset product category) may be generated in advance according to a selection of the anchor, and the aggregation page contains entrances of preset service pages of a plurality of target providers, which may support the anchor to adjust a sequence of a plurality of entrances; for the case where the target provider belongs to a target organization, the target provider may be any provider in the target organization; the set aggregation page may be matched with an aggregation page displayed after a preset control is triggered, for example, the arrangement sequence of the target organization to which the target provider belongs in an aggregation page set by the anchor is the same as that of the target organization to which the target provider belongs in an aggregation page displayed on the user side, however, the stores corresponding to the same target organization in the two aggregation pages respectively might be different, for example, when the anchor selects a product brand A, an entrance of an instant delivery service page of a store a under the product brand A is displayed in the generated aggregation page, and an entrance of an instant delivery service page of a store b under the product brand A might be displayed in the aggregation page displayed after the user triggers a preset control during the live-streaming process, and this is possibly because the store b is closer to the user.

As an example, when the user browses a target live stream matched with a target product category, the live-streaming application may demonstrate a preset control in a live stream push page, and the preset control may be configured to indicate to the user that the current live stream may support an instant delivery service of a product.

Figure 5:
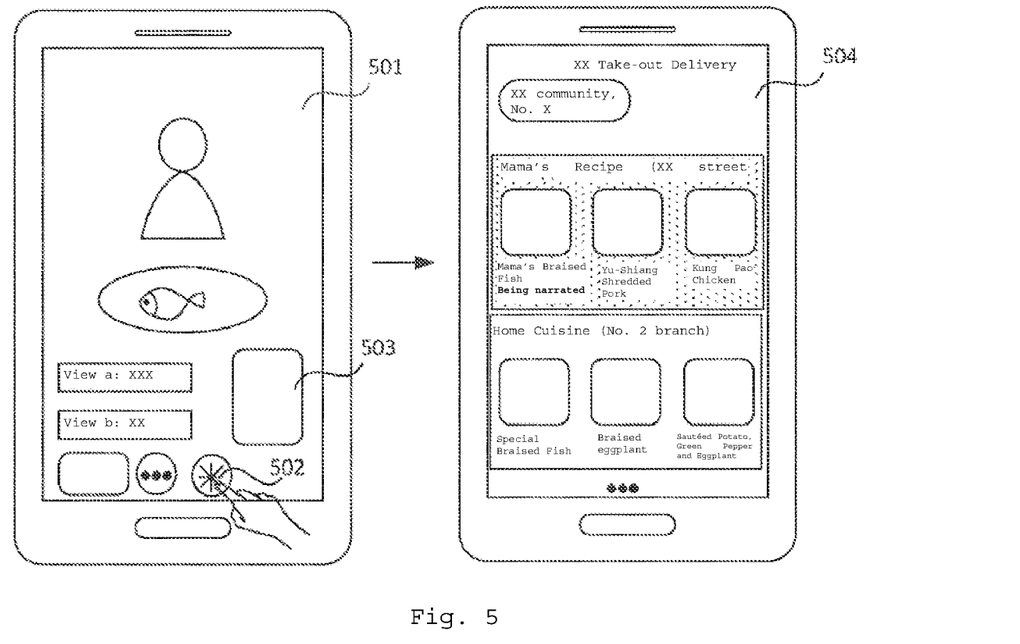
FIG. 5 is a schematic view of a page of another interaction process provided by an embodiment of the present disclosure.

As an example, the preset control may be an icon with a set style, such as a snowflake style, and may also be a narration card corresponding to a target product. FIG. 5 is a schematic view of a page of another interaction process provided by an embodiment of the present disclosure; as shown in FIG. 5, in the live-streaming push page 501, the anchor is narrating Braised Fish belonging to a Home Cuisine category, and the first preset control 502 and the second preset control 503 may be displayed, wherein the second preset control 503 may be a narration card of Braised Fish, so that the user may jump to an aggregation page by triggering either of the first preset control 502 and the second preset control 503.

Step 403, receiving a preset trigger operation acting on a preset control.

Step 404, obtaining the user's location information, and determining a target store corresponding to a target brand selected by an anchor according to the location information.

For example, the anchor sets a plurality of target brands before live-streaming; at this time, the store under the target brand closest to the user may be determined as a target store according to the user's location, which is convenient for the user to obtain a product delivered by the target store more quickly.

Step 405, in response to a preset trigger operation, displaying an aggregation page of a target store configured in advance by the anchor, wherein the aggregation page contains an entrance of an instant delivery service page of the target store, and the instant delivery service page is configured to provide an instant delivery service for a target product belonging to a target product category.

As shown in FIG. 5, the user clicks the preset control 502 to enter an aggregation page 504 of the target store. In the aggregation page 504, entrances of instant delivery service pages of two target stores are displayed, and at an entrance, a preset number of candidate products under the target store may be displayed, for example, the best-selling dishes of a store, and the three best-selling dishes shown in the accompanying drawing serve as candidate products.

Step 406, obtaining a first product that is narrated currently by the anchor.

For example, suppose that the first product that is being narrated by the anchor is Mom's Braised Fish in the "Mom's Recipe" store.

Step 407, performing differential display on an entrance of an instant delivery service page corresponding to a target store of the first product in an aggregation page by using a preset display method.

As shown in FIG. 5, the target store corresponding to the first product that is being narrated is the "Mom's Recipe" store, so that a background color of an entrance of an instant delivery service page of this store may be changed, and the words "being narrated" are displayed below the first product. This is convenient for the user to quickly locate a product that is being narrated by the anchor and understand the details of the product more deeply, thereby selecting a store or product of interest more accurately.

Step 408, receiving a trigger operation for a target entrance input by a user based on an aggregation page.

Step 409, in response to a trigger operation for a target entrance, entering an instant delivery service page of a target store corresponding to a target entrance.

Step 410, receiving a user operation based on an instant delivery service page, and performing related operations of the instant delivery service according to an operation result.

The data interaction method provided by the embodiment of the present disclosure may be applied to a video live scene; before live-streaming, the anchor may select a product category to be recommended or promoted, and then continue to set a plurality of product brands matched with a selected category, and during the live-streaming process, the selected product category is narrated intensely; when the user is interested in this category, it is possible to enter an aggregation page corresponding to a plurality of stores by triggering a preset control; moreover, the aggregation page can display a store and a product that is being currently narrated by the anchor in real time, so as to help the user select a product of interest from a plurality of stores; the interaction forms based on video live-streaming are more diversified, thereby enhancing the interaction effect, expanding the audience and improving the product recommendation efficiency and the traffic efficiency, thereby improving the utilization rate of related resources such as a live-streaming platform or a live-streaming application back-end server or the like.

Figure 6:
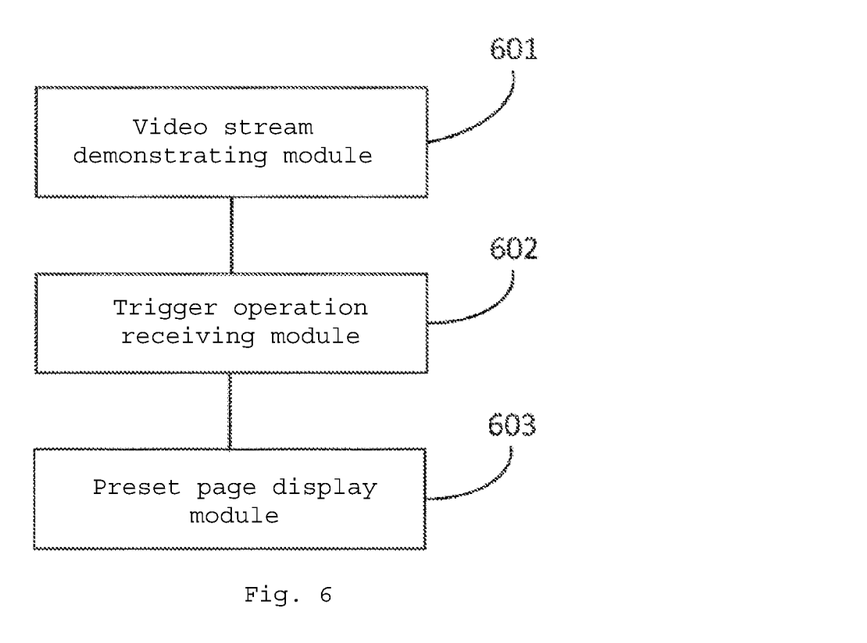
FIG. 6 is a structural block view of a data interaction apparatus provided by an embodiment of the present disclosure.

FIG. 6 is a structural block view of a data interaction apparatus provided by an embodiment of the present disclosure, and the device may be implemented by software and/or hardware, and may be generally integrated in an electronic device, so that data interaction may be performed by performing a data interaction method. As shown in FIG. 6, the device comprises:

a video stream demonstrating module 601 configured to demonstrate a video stream matched with a preset recommended category in a video stream push page of a preset application; a trigger operation receiving module 602 configured to receive a preset trigger operation acting on the video stream push page; and a preset page display module 603 configured to display a preset page corresponding to the preset recommended category in response to the preset trigger operation, wherein the preset page provides a preset service for a recommended object belonging to the preset recommended category.

In the data interaction apparatus provided in the embodiment of the present disclosure, in the pushed video stream, a relevant recommended object is recommended by category, and during the process of the user viewing a video stream matched with a preset recommended category, if the user is interested in a preset recommended category, it is possible to enter into providing a preset service for a recommended object belonging to the preset recommended category by inputting a trigger operation on the video stream push page, thereby improving the probability that different recommended objects under the same category are recommended to the user, and also enriching a selection range of the user with a more flexible recommendation method, diversifying an interactive form, enhancing the interactive effect, and enriching the functions of an application; in addition, it is also possible to improve the traffic efficiency of a preset application, and further improve the utilization rate of related resources such as a corresponding platform or server or the like.

In one embodiment, the preset page comprises an aggregation page of a target provider for providing a preset service for the recommended object, and the aggregation page contains an entrance of a preset service page of the target provider. The device also comprises: a target provider determining module configured to select a target provider from a preset provider set corresponding to the preset application before the displaying a preset page corresponding to the preset recommended category.

In one embodiment, the target provider determining module is configured to select a target provider from a preset provider set corresponding to the preset application according to at least one of the user's location information, the user's interest information on a candidate provider subset, the user's interest information on a recommended object, the user's interest information on the video stream content or the provider's state information, wherein the preset provider set comprises at least one candidate provider subset.

In one embodiment, the target provider determining module is configured to rate each candidate provider in a preset provider set according to at least one of the user's location information, the user's interest information on a candidate provider subset, the user's interest information on a recommended object, the user's interest information on the video stream content or the provider's state information, and determine a target provider according to a rating result. The preset page display module 603 is configured to display a preset page corresponding to the preset recommended category according to a rating result of the target provider, wherein entrances of preset service pages of target providers in the preset page are displayed according to a rating in a descending sequence.

In one embodiment, the video stream carries a category identifier corresponding to the preset recommended category, and the category identifier is set by a poster of the video stream. Wherein, the target provider determining module is configured to select a target provider matched with the category identifier from a preset provider set corresponding to the preset application.

In one embodiment, the preset page comprises an aggregation page of a plurality of target providers, wherein the aggregation page contains entrances of a plurality of preset service pages corresponding to the plurality of target providers respectively, wherein the plurality of target providers are configured to provide a preset service for the recommended object, and a plurality of candidate provider subsets to which the plurality of target providers belong respectively are set by a poster of the video stream.

In one embodiment, the video stream push page comprises a live video stream push page. The device also comprises: a first recommended object obtaining module configured to determine a current recommended object that is being narrated by the anchor while displaying a preset page corresponding to the preset recommended category; displaying an entrance of a preset service page of a target provider of the current recommended object by using a first preset display method, and displaying an entrance of a preset service page of a target provider of the preset recommended object by using a second preset display method in the preset page, wherein the first preset display method is different from the second preset display method.

Figure 7:
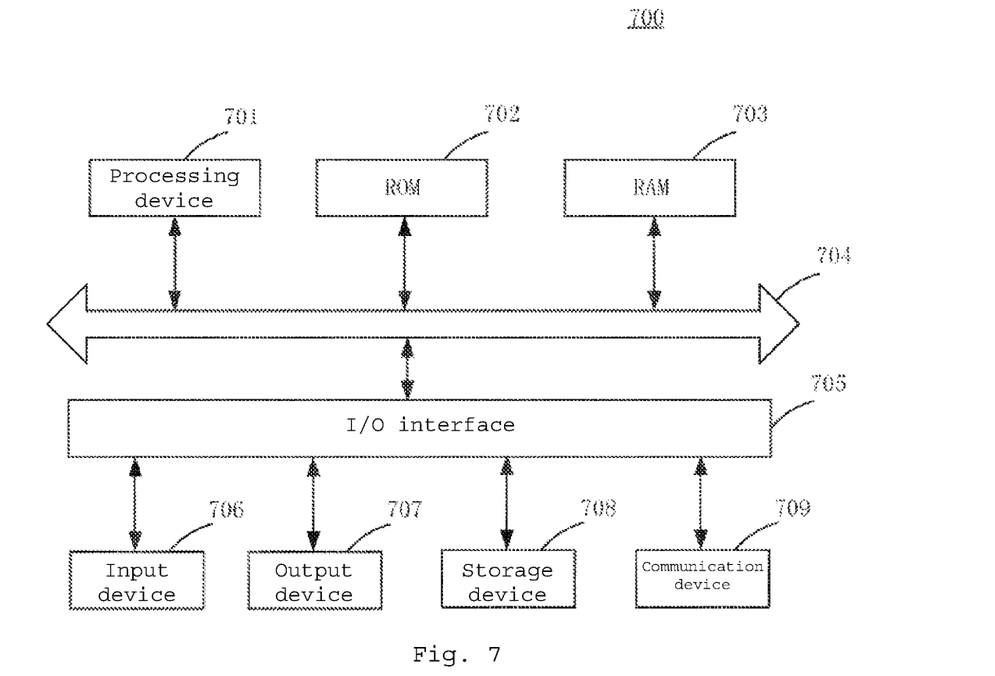
FIG. 7 is a structural block view of an electronic device provided by an embodiment of the present disclosure.

Next, refer to FIG. 7, which shows a structural schematic view of an electronic device 700 suitable for implementing the embodiment of the present disclosure. The electronic device 700 in the embodiment of the present disclosure may comprise, but is not limited to, a mobile terminal such as a mobile phone, a notebook computer, a digital broadcast receiver, a PDA (Personal Digital Assistant), a pad computer (PAD), a PMP (Portable Multimedia Player) and an in-vehicle terminal (for example, an in-vehicle navigation terminal) and the like; and a fixed terminal such as a digital television (TV) and a desktop computer and the like. The electronic device 700 shown in FIG. 7 which is only an example, shall not limit the functions and application range of the embodiments of the present disclosure.

As shown in FIG. 7, the electronic device 700 may comprise a processing device (for example, a central processing unit, a graphic processor, and the like) 701, which may perform a plurality of appropriate actions and processing according to a program stored in a Read-only Memory (ROM) 702 or a program loaded from a storage device 708 into a Random Access Memory (RAM) 703. In the RAM 703, a plurality of programs and data required for the operation of the electronic device 700 are also stored. The processing device 701, the ROM 702 and the RAM 703 are connected to each other through a bus 704. The input/output (I/O) interface 705 is also connected to the bus 704.

Generally, the following devices may be connected to the I/O interface 705: an input device 706 comprising, for example, a touch screen, a touch pad, a keyboard, a mouse, a camera, a microphone, an accelerometer, a gyroscope, and the like; an output device 707 comprising, for example, a Liquid Crystal Display (LCD), a speaker, a vibrator, and the like; a storage device 708 comprising, for example, a magnetic tape, a hard disk, and the like; and a communication device 709. The communication device 709 may allow the electronic device 700 to be in wireless or wired communication with other devices to exchange data. Although FIG. 7 shows the electronic device 700 with a plurality of devices, there is no requirement to implement or equip all the devices shown. It is possible to alternatively implement or equip more or less devices.

According to an embodiment of the present disclosure, the process described above with reference to the flowchart may be implemented as a computer software program. For example, in an embodiment of the present disclosure, there comprises a computer program product, which comprises a computer program carried on a non-transient computer-readable medium, wherein the computer program contains program codes for executing the method shown in the flowchart. In such embodiment, the computer program may be downloaded and installed from the network through the communication device 709, installed from the storage device 708, or installed from the ROM 702. When the computer program is executed by the processing device 701, the above-described functions defined in the method of the embodiment of the present disclosure are executed.

The above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. Examples of the computer-readable storage medium may comprise, but is not limited to: an electrical connection having one or more wires, a portable computer disk, a hard disk, a RAM, a ROM, an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium, and the computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

The above-described computer-readable medium may be comprised in the above-described electronic device; or may also exist alone without being assembled into the electronic device.

The above-described computer-readable medium carries one or more programs that, when executed by the electronic device, cause the electronic device to implement: demonstrating a video stream matched with a preset recommended category in a video stream push page of a preset application; receiving a preset trigger operation acting on the video stream push page; displaying a preset page corresponding to the preset recommended category in response to the preset trigger operation, wherein the preset page provides a preset service for a recommended object belonging to the preset recommended category.

The computer program code for performing the operations of the present disclosure may be written in one or more programming languages or a combination thereof, the above-described programming languages comprising but not being limited to object-oriented programming languages, such as Java, Smalltalk, and C++, and also comprising conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to a plurality of embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession may actually be executed substantially in parallel, and may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The modules involved in the described embodiments of the present disclosure may be implemented in software or hardware. Wherein, the name of a module do not constitute a limitation on the module itself in a case, for example, the trigger operation receiving module may also be described as "a module that receives a preset trigger operation acting on the video streaming push page".

The functions described hereinabove may be performed at least in part by one or more hardware logic components. For example, non-restrictively, the hardware logic components of a demonstrative type that may be used comprise: a Field Programmable Gate Array (FPGA), an Application Specific Integrated Circuit (ASIC), an Application Specific Standard Parts (ASSP), a System on Chip (SOC), a Complex Programmable Logical device (CPLD) and the like.

In the context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, device or device, or any suitable combination thereof. Examples of the machine-readable storage medium may comprise an electrical connection based on one or more wires, a portable computer disk, a hard disk, a RAM, a ROM, an EPROM or flash memory, an optical fiber, a CD-ROM, an optical storage device, a magnetic storage device, or any suitable combination thereof.

According to one or more embodiments of the present disclosure, a data interaction method is provided, the method comprising:

demonstrating a video stream matched with a preset recommended category in a video stream push page of a preset application; receiving a preset trigger operation acting on the video stream push page; and  displaying a preset page corresponding to the preset recommended category in response to the preset trigger operation, wherein the preset page provides a preset service for a recommended object belonging to the preset recommended category.

In one embodiment, the preset page comprises an aggregation page of a target provider for providing a preset service for the recommended object, and the aggregation page contains an entrance of a preset service page of the target provider;

wherein, before the displaying a preset page corresponding to the preset recommended category, there further comprises:

selecting a target provider from a preset provider set corresponding to the preset application.

In one embodiment, the selecting a target provider from a preset provider set corresponding to the preset application comprises:

selecting a target provider from a preset provider set corresponding to the preset application according to at least one of the user's location information, the user's interest information on a candidate provider subset, the user's interest information on a recommended object, the user's interest information on the video stream content or the provider's state information, wherein the preset provider set comprises at least one candidate provider subset.

In one embodiment, the selecting a target provider from a preset provider set corresponding to the preset application according to at least one of the user's location information, the user's interest information on a candidate provider subset, the user's interest information on a recommended object, the user's interest information on the video streaming content or the provider's state information comprises:

rating each candidate provider in a preset provider set according to at least one of the user's location information, the user's interest information on a candidate provider subset, the user's interest information on a recommended object, the user's interest information on the video stream content or the provider's state information, and determining a target provider according to a rating result;

wherein, the displaying a preset page corresponding to the preset recommended category comprises:

displaying a preset page corresponding to the preset recommended category according to a rating result of the target provider, wherein an entrance of a preset service page of a target provider in the preset page is displayed according to a rating in a descending sequence.

In one embodiment, the video stream carries a category identifier corresponding to the preset recommended category, and the category identifier is set by a poster of the video stream; wherein, the selecting a target provider from a preset provider set corresponding to the preset application comprises:

selecting a target provider matched with the category identifier from a preset provider set corresponding to the preset application.

In one embodiment, the preset page comprises an aggregation page of a plurality of target providers, wherein the aggregation page contains entrances of a plurality of preset service pages corresponding to the plurality of target providers respectively, wherein the plurality of target providers are configured to provide a preset service for the recommended object, and a plurality of candidate provider subsets to which the plurality of target providers belong respectively are set by a poster of the video stream.

In one embodiment, the video stream push page comprises a live video stream push page;

wherein, while displaying a preset page corresponding to the preset recommended category, there also comprises:

determining a current recommended object that is being narrated by the anchor; and     displaying an entrance of a preset service page of a target provider of the current recommended object by using a first preset display method, and displaying an entrance of a preset service page of a target provider of the preset recommended object by using a second preset display method in the preset page, wherein the first preset display method is different from the second preset display method.

According to one or more embodiments of the present disclosure, a data interaction apparatus is provided, the apparatus comprising:

a video stream display module configured to demonstrate a video stream matched with a preset recommended category in a video stream push page of a preset application;

a trigger operation receiving module configured to receive a preset trigger operation acting on the video stream push page; and     a preset page display module configured to display a preset page corresponding to the preset recommended category in response to the preset trigger operation, wherein the preset page provides a preset service for a recommended object belonging to the preset recommended category.

In addition, although a plurality of operations are depicted in a specific order, this should not be understood as requiring these operations to be performed in the specific order shown or performed in a sequential order. Under certain circumstances, multitasking and parallel processing might be advantageous. Likewise, although a plurality of implementation details are contained in the above-described discussion, these should not be construed as limiting the scope of the present disclosure. Some features that are described in the context of individual embodiments may also be implemented in combination in a single embodiment. On the contrary, a plurality of features described in the context of a single embodiment may also be implemented in multiple embodiments individually or in any suitable sub-combination.

What is claimed is:

1. A data interaction method, comprising:

displaying a video stream matched with a preset recommended category in a video stream push page of a preset application, wherein the preset recommended category is a category to which an object contained in the video stream belongs, which is obtained by identifying the content of the video stream by the preset application;

receiving a preset trigger operation acting on the video stream push page; and displaying a preset page corresponding to the preset recommended category in response to the preset trigger operation, wherein the preset page provides a preset service for a plurality of recommended objects belonging to the preset recommended category, wherein the plurality of recommended objects belong to a plurality of subcategories under the preset recommended category, wherein the preset page comprises an aggregation page of one or more target providers for providing a preset service for the recommended object, and the aggregation page contains an entrance of a preset service page of the target provider; and before the displaying a preset page corresponding to the preset recommended category, the method further comprises:

selecting the target provider from a preset provider set corresponding to the preset application according to at least two items of user's location information, user's interest information on a candidate provider subset, user's interest information on a recommended object, user's interest information on a video stream content or provider's state information, wherein the at least two items are set based on a type of the preset service, and the preset provider set comprises at least one candidate provider subset.

2. The method according to claim 1, wherein the selecting the target provider from a preset provider set corresponding to the preset application according to at least two items of user's location information, user's interest information on a candidate provider subset, user's interest information on a recommended object, user's interest information on a video stream content or provider's state information comprises:

rating each candidate provider in the preset provider set according to at least two items of the user's location information, the user's interest information on a candidate provider subset, the user's interest information on a recommended object, the user's interest information on a video stream content or the provider's state information, and determining the target provider according to a rating result; and the displaying a preset page corresponding to the preset recommended category comprises:

displaying a preset page corresponding to the preset recommended category according to a rating result of the target provider, wherein entrances of preset service pages of target providers in the preset page are displayed according to a rating in a descending sequence.

3. The method according to claim 1, wherein the video stream carries a category identifier corresponding to the preset recommended category, and the category identifier is set by a poster of the video stream; and the selecting the target provider from a preset provider set corresponding to the preset application comprises:
    selecting a target provider matched with the category identifier from a preset provider set corresponding to the preset application.

4. The method according to claim 1, wherein the preset page comprises an aggregation page of a plurality of target providers, the aggregation page contains entrances of a plurality of preset service pages corresponding to the plurality of target providers respectively, the plurality of target providers are configured to provide a preset service for the recommended object, and a plurality of candidate provider subsets to which the plurality of target providers belong respectively are set by a poster of the video stream.

5. The method according to claim 4, wherein the video stream push page comprises a live video stream push page;
    in a case where a preset page corresponding to the preset recommended category is displayed, the method further comprises:
    determining a current recommended object that is being narrated by an anchor;
    displaying an entrance of a preset service page of the target providers of the current recommended object by using a first preset display method, and displaying an entrance of a preset service page of the target providers of a reset recommended object by using a second preset display method in the preset page, wherein the first preset display method is different from the second preset display method.

6. An electronic device, comprising a memory, a processor and a computer program stored in the memory and executable on the processor, wherein the processor, when executing the computer program, performs a data interaction method comprising:
    displaying a video stream matched with a preset recommended category in a video stream push page of a preset application, wherein the preset recommended category is a category to which an object contained in the video stream belongs, which is obtained by identifying the content of the video stream by the preset application;
    receiving a preset trigger operation acting on the video stream push page; and
    displaying a preset page corresponding to the preset recommended category in response to the preset trigger operation, wherein the preset page provides a preset service for a plurality of recommended objects belonging to the preset recommended category, wherein the plurality of recommended objects belong to a plurality of subcategories under the preset recommended category,
    wherein the preset page comprises an aggregation page of one or more target providers for providing a preset service for the recommended object, and the aggregation page contains an entrance of a preset service page of the target provider; and
    before the displaying a preset page corresponding to the preset recommended category, the method further comprises:
    selecting the target provider from a preset provider set corresponding to the preset application according to at least two items of user's location information, user's interest information on a candidate provider subset, user's interest information on a recommended object, user's interest information on a video stream content or provider's state information, wherein the at least two items are set based on a type of the preset service, and the preset provider set comprises at least one candidate provider subset.

7. A non-transitory computer-readable storage medium having a computer program stored thereon that, when executed by a processor, implements a data interaction method comprising:
    displaying a video stream matched with a preset recommended category in a video stream push page of a preset application, wherein the preset recommended category is a category to which an object contained in the video stream belongs, which is obtained by identifying the content of the video stream by the preset application;
    receiving a preset trigger operation acting on the video stream push page; and
    displaying a preset page corresponding to the preset recommended category in response to the preset trigger operation, wherein the preset page provides a preset service for a plurality of recommended objects belonging to the preset recommended category, wherein the plurality of recommended objects belong to a plurality of subcategories under the preset recommended category,
    wherein the preset page comprises an aggregation page of one or more target providers for providing a preset service for the recommended object, and the aggregation page contains an entrance of a preset service page of the target provider; and
    before the displaying a preset page corresponding to the preset recommended category, the method further comprises:
    selecting the target provider from a preset provider set corresponding to the preset application according to at least two items of user's location information, user's interest information on a candidate provider subset, user's interest information on a recommended object, user's interest information on a video stream content or provider's state information, wherein the at least two items are set based on a type of the preset service, and the preset provider set comprises at least one candidate provider subset.

8. The electronic device according to claim 6, wherein the selecting the target provider from a preset provider set corresponding to the preset application according to at least two items of user's location information, user's interest information on a candidate provider subset, user's interest information on a recommended object, user's interest information on a video stream content or provider's state information comprises:
    rating each candidate provider in the preset provider set according to at least two items of the user's location information, the user's interest information on a candidate provider subset, the user's interest information on a recommended object, the user's interest information on a video stream content or the provider's state information, and determining the target provider according to a rating result; and
    the displaying a preset page corresponding to the preset recommended category comprises:
    displaying a preset page corresponding to the preset recommended category according to a rating result of the target provider, wherein entrances of preset service pages of target providers in the preset page are displayed according to a rating in a descending sequence.

9. The electronic device according to claim 6, wherein the video stream carries a category identifier corresponding to the preset recommended category, and the category identifier is set by a poster of the video stream; and the selecting the target provider from a preset provider set corresponding to the preset application comprises:
selecting a target provider matched with the category identifier from a preset provider set corresponding to the preset application.

10. The electronic device according to claim 6, wherein the preset page comprises an aggregation page of a plurality of target providers, the aggregation page contains entrances of a plurality of preset service pages corresponding to the plurality of target providers respectively, the plurality of target providers are configured to provide a preset service for the recommended object, and a plurality of candidate provider subsets to which the plurality of target providers belong respectively are set by a poster of the video stream.

11. The electronic device according to claim 10, wherein the video stream push page comprises a live video stream push page;

in a case where a preset page corresponding to the preset recommended category is displayed, the method further comprises:
determining a current recommended object that is being narrated by an anchor;
displaying an entrance of a preset service page of the target providers of the current recommended object by using a first preset display method, and displaying an entrance of a preset service page of the target providers of a preset recommended object by using a second preset display method in the preset page, wherein the first preset display method is different from the second preset display method.

12. The non-transitory computer-readable storage medium according to claim 7, wherein the selecting the target provider from a preset provider set corresponding to the preset application according to at least two items of user's location information, user's interest information on a candidate provider subset, user's interest information on a recommended object, user's interest information on a video stream content or provider's state information comprises:

rating each candidate provider in the preset provider set according to at least two items of the user's location information, the user's interest information on a candidate provider subset, the user's interest information on a recommended object, the user's interest information on a video stream content or the provider's state information, and determining the target provider according to a rating result; and the displaying a preset page corresponding to the preset recommended category comprises:
displaying a preset page corresponding to the preset recommended category according to a rating result of the target provider, wherein entrances of preset service pages of target providers in the preset page are displayed according to a rating in a descending sequence.

13. The non-transitory computer-readable storage medium according to claim 7, wherein the video stream carries a category identifier corresponding to the preset recommended category, and the category identifier is set by a poster of the video stream; and the selecting the target provider from a preset provider set corresponding to the preset application comprises:
selecting a target provider matched with the category identifier from a preset provider set corresponding to the preset application.

14. The non-transitory computer-readable storage medium according to claim 7, wherein the preset page comprises an aggregation page of a plurality of target providers, the aggregation page contains entrances of a plurality of preset service pages corresponding to the plurality of target providers respectively, the plurality of target providers are configured to provide a preset service for the recommended object, and a plurality of candidate provider subsets to which the plurality of target providers belong respectively are set by a poster of the video stream.

* * * * *